Nov. 5, 1940.     J. L. BLOOMHEART     2,220,672
RESPIRATOR CONTROL
Filed March 16, 1939
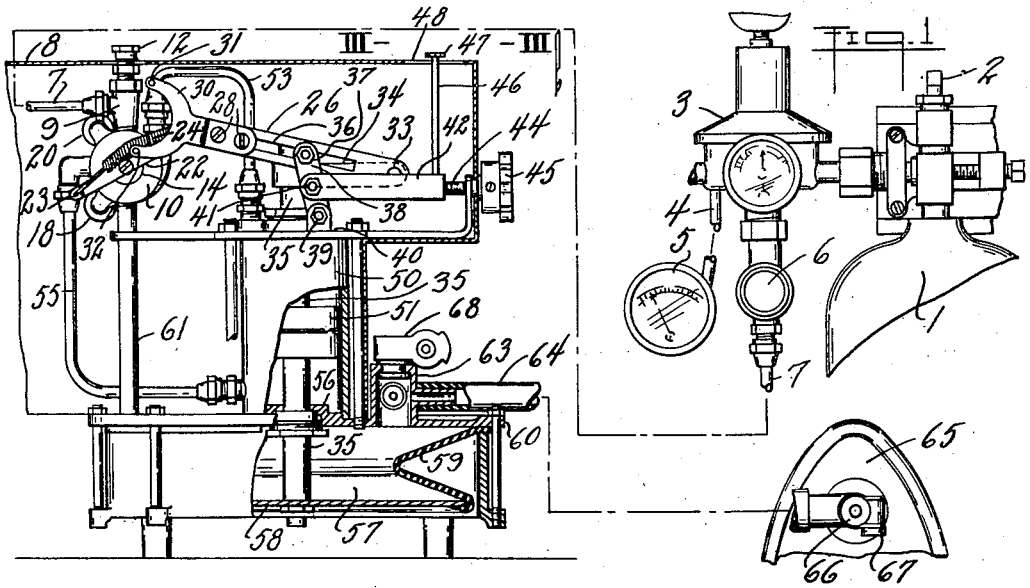
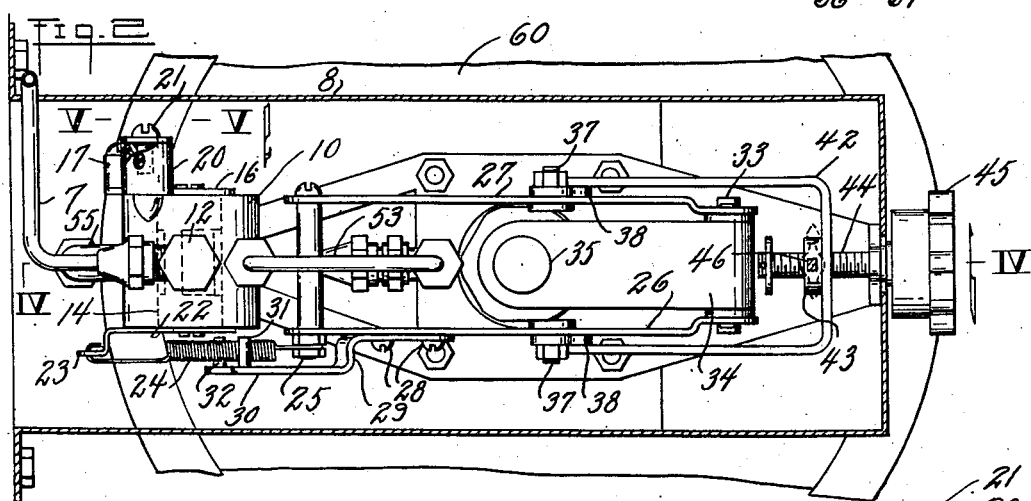
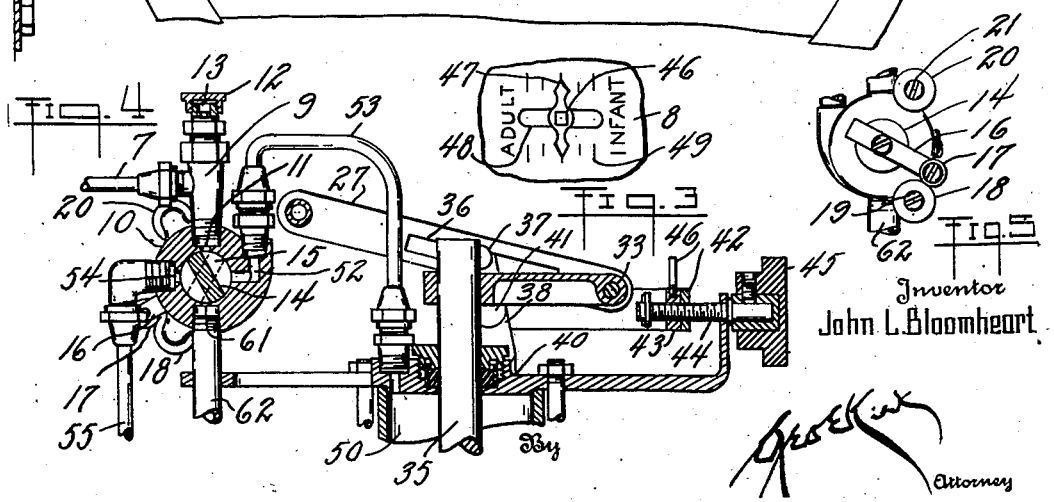
Inventor
John L. Bloomheart Patented Nov. 5, 1940

2,220,672

UNITED STATES PATENT OFFICE 2,220,672

RESPIRATOR CONTROL

John L. Bloomheart, Toledo, Ohio, assignor to Martha F. McKesson, Toledo, Ohio

Application March 16, 1939, Serial No. 262,089

4 Claims. (Cl. 230—20)

This invention relates to breathing apparatus, especially for supplying inhalation gas for respiration in controlled volume.

This invention has utility when incorporated in adjustable features for limiting the range for automatic sequence of operations, more particularly as to the quantity per inhalation.

Referring to the drawing:

Fig. 1 is a side elevation, with parts broken away, of an embodiment of the invention in a resuscitator or inhaler type of apparatus, such as shown in McKesson Patent No. 2,063,043, December 8, 1936;

Fig. 2 is a plan view of the control features of the motor and pump of Fig. 1;

Fig. 3 is a view on the line III—III, Fig. 1, showing the indicator;

Fig. 4 is a section on the line IV—IV, Fig. 2, showing features of the valve and adjustable control lever therefor; and Fig. 5 is a view on the line V—V, Fig. 2, showing the valve housing in elevation and the limits for the control.

Gas under pressure may be in container 1, say as oxygen, to have flow therefrom controlled by valve 2 for passage by reducing valve 3. The pressure of this supply gas from the chamber 1 may be through duct 4 to gage 5. This supply gas from the reducing valve 3 may be effective by opening valve 6 for flow by way of duct 7 into housing 8 to fitting 9 mounted on valve housing 10. Communication of fitting 9 to the housing 10 is by port 11. This fitting 9 is provided with cap 12 for supply of lubricant through port 13 for oscillating member 14 in valve chamber 15. Fixed with this member 14 is arm 16 having terminal roller or offset 17 to abut cushion 18 on set screw 19 at one limit of throw and cushion 20 of rubber on set screw 21 at its other limit of throw. Angularly fixed as to this arm 16 but at the opposite end of this valve member 14 is arm 22 having offset 23 engaged by tension helical spring 24 extending to pin 25 at the free end of parallel lever arms 26, 27. Fixed with the lever arm 26 by screws 28 is supplemental arm having offset 29 and forks 30 having at their free ends fingers 31, 32, adapted to engage the helical spring 24 in the throw limit positions of this lever device 26, 27, having pin 33 engaged by bracket 34 fixed with piston rod 35. This lever 26, 27, intermediate the pins 25, 33, has therealong seat portions or slots 36 engaged by fulcrum bearing-providing portions 37 on link 38 rising from pin 39 at cylinder head portion 40.

This link 38, medially of its length, has pin 41 from which extends yoke or U-shaped member 42 engaged by nut 43 on axially fixed screw 44 projecting from the housing 8 to have hand wheel 45. Rising from this nut 43 as engaging the yoke 42 is stem 46 to carry indicator 47 above slot 48 in the housing 8 in proximity to marker region 49 (Fig. 3). This adjustment limit marker or gage scheme means that with the nut 43 adjusted from the hand wheel 44 to shove the yoke 42 toward the valve casing 10 thereby rocks the link 38 to shift the fulcrum 37 to such extent toward the casing 10 that the transit or travel distance for the piston rod 35 is increased before the lever actuator controls the valve to give it a snap throw in the reverse direction. As there is hand adjustment at the hand wheel 45 to the reverse limit, it means that the lever is more sensitive to less transit of the piston rod 35 and thus cuts off volume more rapidly at the valve device. This piston rod 35 extends into cylinder 50 and there carries piston 51. This is a motor device having its strokes thereto controlled by port 52 (Fig. 4) and duct 53 for down stroke and port 54 and duct 55 for up stroke of this fluid motor and reciprocatory device.

Through lower piston head 56 (Fig. 1) of this piston and cylinder device, piston rod 35 extends through chamber 57 to wall 58 having bellows connection 59 with housing 60. This means that, as the valve device 14 is in the position shown in Fig. 4 for downward stroke of the piston 35, exhaust from the lower side of the motor device may flow by duct 55 to this valve 10 and therefrom by port 61 and duct 62 to charge this chamber 57. At the reverse operation, the contraction of the chamber 57 causes flow therefrom by housing device 63 and duct 64 to mask 65 at the patient, wherein there is located pressure relief valve 66 and its adjustable resistance control 67. At the fitting 63 there is relief valve device 68.

As the power stroke of the motor is away from the bellows device of the pump, the exhaust from the previous upper or power stroke is by way of the duct 53 into the casing 10 and by way of the duct 62 to the bellows as in excess of the exhaust. This supply of inhalation gas by the motor through this pump is of resuscitator action to the patient in furnishing inhalation for the patient. The reverse stroke on expanding of the bellows is an exhalation promoting factor beyond that of the capacity of the gas supplied and promotes exhalation by the patient in reducing the pressure at the mask. The regulation of the valve 6 as to the rate of flow can be a factor in determining the frequency of reciprocation of these devices, while the adjustment at the hand wheel 45 is a definite factor in determining the volume. It is thus seen that hereunder these adjustments permit a range of volume control for respiratory gases to a patient for resuscitation or breathing inhalation over ranges as may be appropriate.

What is claimed and it is desired to secure by United States Letters Patent is:

1. For respiration apparatus involving a fluid pump, the combination of an interconnected fluid motor, said pump and motor having a common reciprocable transmission rod therebetween, motive fluid connection for effecting power stroke of the rod in opposite directions, a control valve for the pump, and a motor actuator controller for the valve including a lever pivotally connected to the rod rockable relatively to the valve, a quick throw connection from the lever to snap the valve adjacent travel limit position of the lever for directing to the pump motive fluid exhaust from the opposite directions of the motor operation, and means for adjusting the fulcrum of the lever to vary the functioning of the motor, thereby determining the pulsing volume for the pump to handle from the exhausts of the motor.

2. For respiration apparatus involving a reciprocatory fluid pump, the combination of an interconnected fluid motor, said pump and motor having a common reciprocable transmission rod therebetween, motive fluid connection for effecting power stroke of the rod in opposite directions, a rockable control valve for the pump, and a motor actuator controller for the valve including a bracket fixed with the rod, a lever pivoted to the bracket and rockable relatively to the valve, a quick throw connection from the lever to snap the valve adjacent travel limit position of the lever for directing to the pump motive fluid exhaust from the opposite directions of the motor operation, and means for adjusting the fulcrum of the lever to vary the stroke of the motor, thereby determining the pulsing volume for the pump to handle from the exhausts of the motor.

3. For respiratory apparatus involving a reciprocable fluid pump device, the combination therewith of an interconnected motor device, motive fluid connection for effecting power stroke of the device in opposite directions, a rockable control valve for the pump device, a bracket fixed with the rod, a lever pivoted to the bracket and rockable relatively to the valve, a rockable link providing a shiftable fulcrum for the lever, and means for adjusting the fulcrum of the lever to vary the stroke of one of the devices, in thereby determining the pulsing volume for the pump device to handle from the exhausts of the motor device.

4. For respiratory apparatus involving a reciprocable fluid pump device, the combination therewith of an interconnected motor device, motive fluid connection for effecting power stroke of the device in opposite directions, a rockable control valve for the pump device, a bracket fixed with the rod, a lever pivoted to the bracket, rockable relatively to the valve and having seat means therealong for a fulcrum bearing, a rockable link providing a shiftable fulcrum for coacting with said seat means of the lever, and means for adjusting the fulcrum of the lever to vary the stroke of the motor device, in thereby determining the pulsing volume for the pump device to handle from the exhausts of the motor device.

JOHN L. BLOOMHEART.